(12) United States Patent
Barre et al.

(10) Patent No.: US 9,400,066 B2
(45) Date of Patent: Jul. 26, 2016

(54) FIXTURE DEVICE FOR AN AIRCRAFT TUBING

(75) Inventors: Thomas Barre, Toulouse (FR);
Matthieu Biteau, Toulouse (FR);
Olivier Bourbon, Aucamville (FR);
Alexis Courpet, Fronton (FR);
Jean-Marc Roques, Toulouse (FR);
Cedric Sable, Toulouse (FR)

(73) Assignee: Airbus Operations (S.A.S.), Toulouse (FR)

(*) Notice: Subject to any disclaimer, the term of this patent is extended or adjusted under 35 U.S.C. 154(b) by 120 days.

(21) Appl. No.: 13/462,339

(22) Filed: May 2, 2012

(65) Prior Publication Data

US 2012/0280092 A1    Nov. 8, 2012

(30) Foreign Application Priority Data

May 3, 2011    (FR) ...................................... 11 53751

(51) Int. Cl.
*F16L 3/08*    (2006.01)
*F16L 3/237*    (2006.01)
*F16L 3/10*    (2006.01)

(52) U.S. Cl.
CPC ............... *F16L 3/237* (2013.01); *F16L 3/1091* (2013.01)

(58) Field of Classification Search
CPC ............................... F16L 3/2235; F16L 21/022
USPC ............ 248/648, 49, 62, 65, 68.1, 74.1, 74.4
See application file for complete search history.

(56) References Cited

U.S. PATENT DOCUMENTS

| | | | | |
|---|---|---|---|---|
| 2,912,075 A | * | 11/1959 | Pfistershammer | 52/834 |
| 2,999,700 A | * | 9/1961 | Smith | 285/332.3 |
| 3,576,304 A | * | 4/1971 | Gillemot et al. | 248/74.2 |
| 4,300,738 A | * | 11/1981 | Whinfrey | 248/62 |
| 4,782,706 A | * | 11/1988 | Kister et al. | 73/779 |
| 4,971,268 A | * | 11/1990 | Dobrowski et al. | 244/135 R |
| 5,659,652 A | * | 8/1997 | D'Entremont | 385/147 |
| D485,161 S | * | 1/2004 | Hutchinson | D8/383 |
| D537,332 S | * | 2/2007 | Nagle | D8/396 |
| 7,658,351 B2 | * | 2/2010 | Hansen | 248/74.3 |
| D635,447 S | * | 4/2011 | Henry | D8/356 |
| 2004/0124320 A1 | * | 7/2004 | Vantouroux | 248/68.1 |
| 2004/0244188 A1 | * | 12/2004 | Hutchinson | 29/753 |
| 2006/0249636 A1 | * | 11/2006 | Thiedig et al. | 248/74.4 |
| 2009/0218451 A1 | * | 9/2009 | Lundborg | 248/56 |

(Continued)

FOREIGN PATENT DOCUMENTS

DE    7244573    3/1973
EP    1 388 699 A1    2/2004
(Continued)

OTHER PUBLICATIONS

Victrex Peek Polymer Jan. 5, 2009 (https://web.archive.org/web/20090105162834/http://www.victrex.com/en/polymer-metal-replacement.html).*

(Continued)

*Primary Examiner* — Shin Kim
(74) *Attorney, Agent, or Firm* — Oblon, McClelland, Maier & Neustadt, L.L.P.

(57) ABSTRACT

A device to attach an aircraft's piping that includes a clamping ring made up of two jaws shaped into a gliding arc breaker separator and including at least one transverse support cut-out for at least one tube.

21 Claims, 4 Drawing Sheets

(56) References Cited

U.S. PATENT DOCUMENTS

Figure 4:
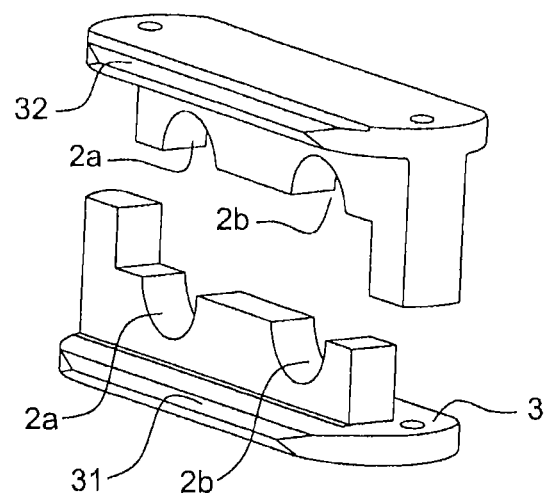

2010/0148018 A1* 6/2010 Schoenau et al. ............ 248/74.4
2010/0193651 A1* 8/2010 Railsback et al. ....... 248/229.24

FOREIGN PATENT DOCUMENTS

EP          1 701 076 A2    9/2006
WO     WO 2007/075141 A1    7/2007

OTHER PUBLICATIONS

French Preliminary Search Report and Written Opinion issued Oct. 5, 2011, in French 1153751, filed May 3, 2011 (with English Translation of Categories of Cited Documents).

* cited by examiner

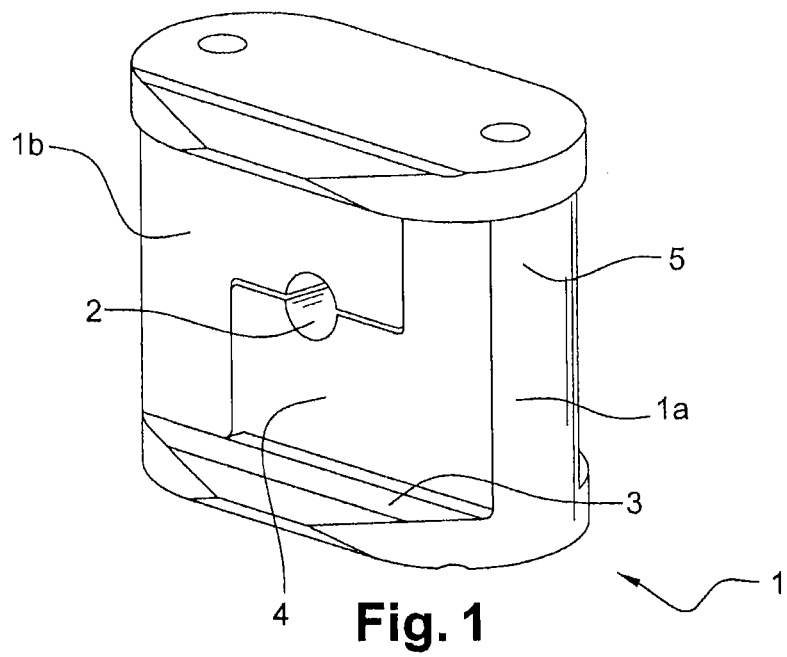
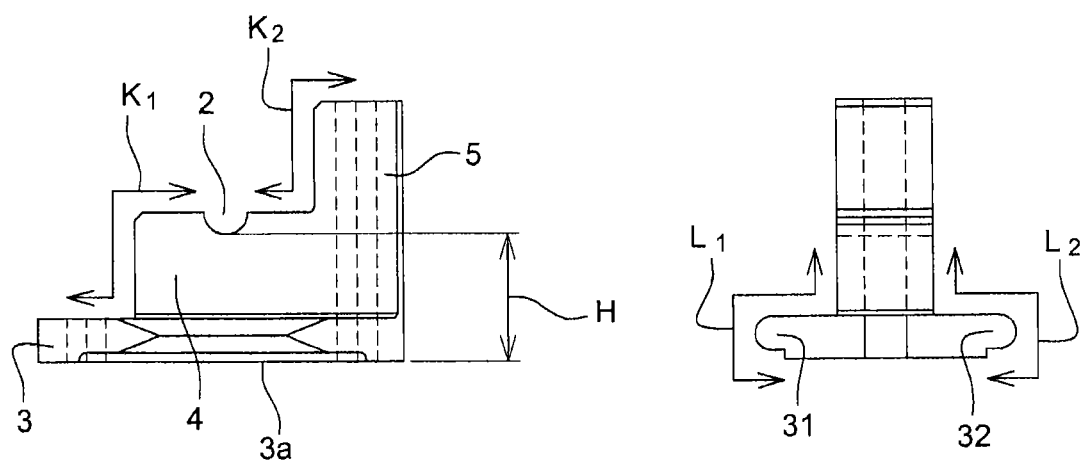
Fig. 1
Fig. 2
Fig. 3

FIXTURE DEVICE FOR AN AIRCRAFT TUBING

This invention relates to a device for fastening piping in an aircraft that provides protection from the passage of lightning currents and electrical arcing.

In aircraft with a composite structure, when lightning strikes, electrical currents can propagate through the aircraft's structure at the fuselage and the wings; these currents may possibly reach the structure of the fuel tanks.

The structure of such aircraft is usually made of relatively low-conductivity carbon and electrical currents will tend to favor passing across metal elements mounted on the structure.

Rigid metal piping is routed in the vicinity of the aircraft's tanks; it is fastened, using clamping rings, onto metal mounts, which are linked to the plane's grounding network and fastened to the composite structure.

Because of this, the metal mountings can conduct currents coming from the composite structure; if the lightning currents were to encounter the tanks, they might have a tendency to use the path of least resistance and propagate through the metal piping.

Because of the proximity between the metal mountings and the metal piping, electrical arcs can be created.

It is therefore necessary to break the flow of current by inserting insulators; in addition, these insulators must prevent the creation of electrical arcs between the piping and the metal mountings.

This invention provides a solution to this problem, mainly in the vicinity of the clamping rings used in fastening the rigid metal piping in a composite material aircraft tank.

The goals of the device according to the invention are to allow attaching the piping on the structure using mountings that provide electrical insulation and separation; and to allow grounding the clamping rings on the aircraft's electrical network ground.

This device must be resistant to kerosene, be adaptable to the different diameters required on a system installation, allow the installation of one or more pipes, isolate them from high intensity currents such as short circuits or lightning currents, avoid electrical arcs and evacuate electrostatic charges.

The device must be designed to withstand the existing forces and allow the use of existing components such as hardware, metal pipes and others.

The device should allow a translation of the piping to allow installation without stress.

To do this, the invention provides a device to fasten an aircraft's piping that includes a clamping ring made up of two jaws shaped into a gliding arc breaker separator and comprising at least one transverse support cut-out for at least one tube.

The separators are designed so as to avoid gliding arcs being generated between the metal parts to which the jaws are connected.

Preferably the jaws are nesting symmetrical parts.

The jaws advantageously comprise a baseplate, a ridge that rises from the baseplate and whose upper surface comprises said at least one transverse cut-out.

The baseplate comprises a base, which is wider than the ridge and which makes a section that increases the running distance between a base and the tube or tubes.

According to a particular embodiment, the device comprises a column that extends the ridge on a first side of the ridge; the upper surfaces of the baseplate, of the ridge and of the column make up a stair-shaped section.

The ridge is preferably offset on one longitudinal side of the baseplate, leaving a side of the baseplate free.

Advantageously, the column of a first jaw completes the ridge of a second jaw on the free side of the baseplate of said second jaw.

According to a particular embodiment, the ridge comprises several cut-outs to receive tubes.

According to a variant in which the ridge comprises multiple cut-outs to receive tubes, the upper surface of the ridge comprises between the cuts at least one crenellated section that increases the running distance between tubes between said cut-outs.

In a complementary or alternative way, the lateral flanks of the ridge comprise ribs that increase the running distance between tubes between said cut-outs.

Figure 5:
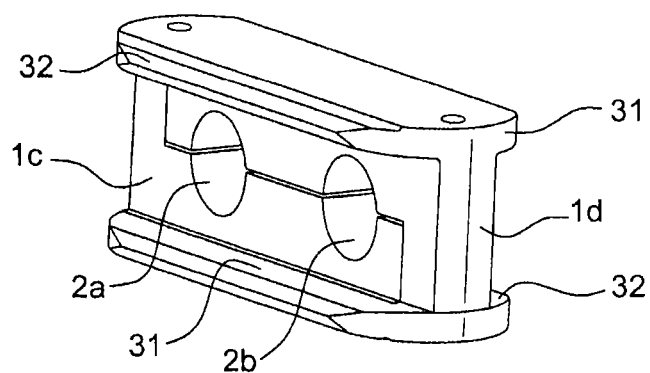
Figure 6:
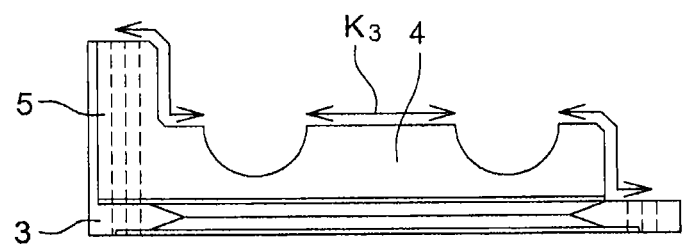
Figure 7:
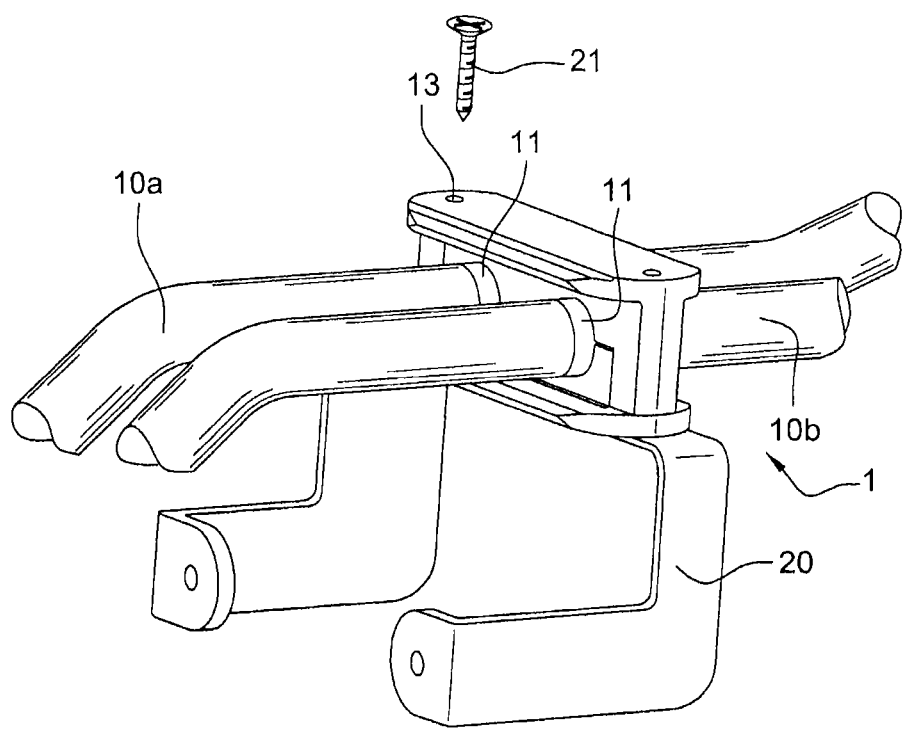
Figure 8:
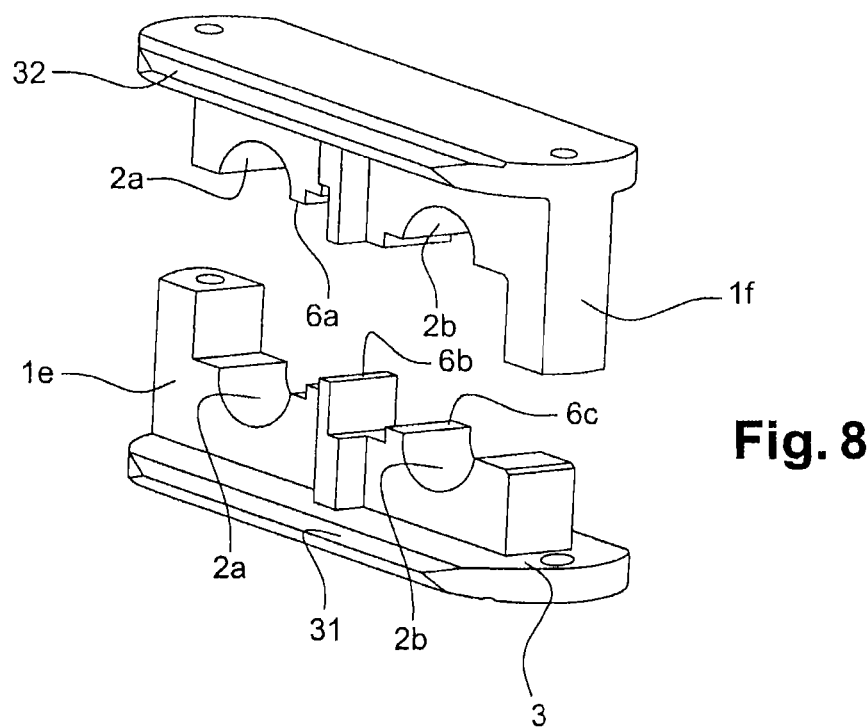
Figure 9:
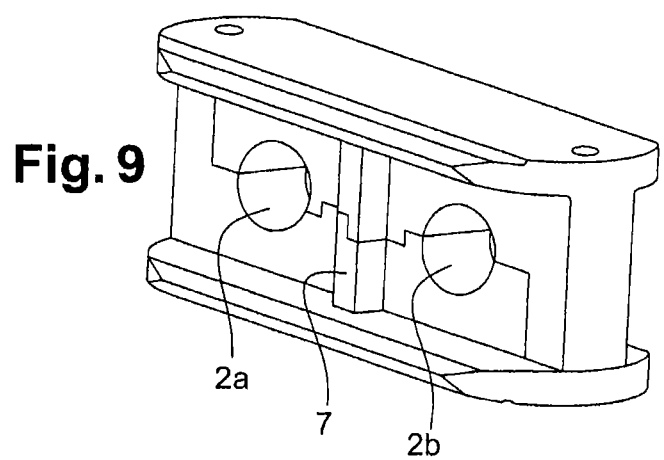

Other features and advantages of the invention will become apparent in reading the following description of non-limiting examples of realization of the invention with drawings, which show:

in FIG. 1: a perspective view of a first example of realization of a fastening device according to the invention;

in FIG. 2: a jaw of the device in FIG. 1 as a front view;

in FIG. 3: the jaw in FIG. 2 as a side view;

in FIG. 4: a perspective view of a second example of realization of a fastening device according to the invention before nesting;

in FIG. 5: a perspective view of the device in FIG. 4 after nesting;

in FIG. 6: a jaw of the device in FIG. 4 as a front view;

in FIG. 7: a perspective view of an embodiment of tube assembly using the device in FIG. 4;

in FIG. 8: a perspective view of a variant of the device in FIG. 4 before nesting;

in FIG. 9: a perspective view of the device in FIG. 8 after nesting;

The device for fastening aircraft piping according to the invention consists of a clamping ring 1, for which a first example of realization is shown in FIGS. 1 to 3, a second example is shown in FIGS. 4 to 6 and a variant of this second example is shown in FIGS. 8 and 9; it is shown in use in FIG. 7.

The clamping ring of FIG. 1 is made up of two jaws $1a$, $1b$, which comprise a transverse cut-out 2 to support a tube which is part of piping and in particular of aircraft fuel piping.

The clamping ring of FIGS. 4 and 8 comprise two jaws $1c$, $1d$ and $1e$, $1f$, which comprise two transverse cut-outs $2a$, $2b$ to support two tubes.

The jaws are shaped into a gliding arc breaker separator between the tubes and between the tubes and bases 20, examples of which are shown in FIGS. 9A and 9B.

To do this, going back to FIGS. 2 and 3, the contours of the jaws are designed to obtain an "air gap" determined to avoid any arc between the metal parts at tensions that may be encountered in the event of lightning strike between piping and structure.

To make the idea more concrete, a realization constraint is that the chosen minimum distance between 2 separate metal parts is 10 mm, in order to avoid the electrical breakdown, knowing that breakdown in air occurs at around 10 kilovolts for such a distance. According to the example shown, a mean distance of the order of 25 mm is set between the tubes and between the tubes and the structure; this distance may be decreased by adding sections that increase the running distance between parts (increase the surface travel of the parts), thus preserving a good level of immunity from gliding arcs.

In FIG. 2, the height H between the lower surface $3a$ of the jaw and the low point of the cut-out 2 is determined to obtain sufficient insulation; paths K1 and K2, which follow the section of the upper surface of the jaw between the outside of the jaw and the cut-outs, give a maximum distance for the section to prevent the gliding arcs.

In FIG. 3, the lateral surfaces of the jaws comprise wings 31, 32 which increase the paths L1, L2 on the surface of the jaw.

As an illustrative example, the minimum distances K1, K2 are 25 mm for insulation that complies with the application, the minimum distance of paths L1 and L2 is also 25 mm.

The jaws 1a, 1b are symmetrical nesting parts, as are the jaws 1c, 1d of the example in FIG. 4 and the jaws 1e, 1f in FIG. 8.

The jaws comprise a baseplate 3, a ridge 4 that rises from the baseplate, arranged longitudinally on the baseplate to receive the tube or tubes in the half-moon-shaped transverse cut-out 2, 2a, 2b made in the upper surface of the jaw and a column 5 that extends the ridge on a first side of the ridge.

In the context of increasing the air gap, the upper surfaces of the baseplate, the ridge and the column make a stair-shaped section, as shown in FIG. 2, which creates the paths K1, K2 at the upper surface of the jaws.

The ridge 4 is offset on one longitudinal side of the baseplate 3, leaving a side of the baseplate free and the column 5 of a first jaw completes the ridge 4 of a second jaw 1b on the free side of the baseplate 3 of said second jaw.

The same applies to the example of FIG. 4 that receives two tubes 10a, 10b represented on the example in FIG. 7.

In all the examples shown and as in FIG. 3, the baseplate comprises a base that is wider than the ridge and that makes a section that increases the running distance between a bracket or cradle 20 and the tube or tubes 10a, 10b.

To achieve this, the baseplate extends laterally beyond both sides of the ridge and of the column; it makes up wings 31, 32 to increase the distance L1, L2 of immunity from gliding arcs, as seen previously.

Where the ridge comprises several cut-outs to receive tubes, the distance K3 between cut-outs, according to FIG. 6—front view of a jaw of the clamping ring, is determined to remove all risk of arcing between tubes.

As an illustration, distance K3 is chosen to be greater than or equal to 25 mm.

To further increase this distance of immunity against gliding arcs, according to the example in FIGS. 8 and 9, the upper surface of the ridge comprises, between the cut-outs, one or several crenellated sections 6a, 6b, 6c (3 according to the example) that increase the running distance between the tubes at the slot between jaws between the cuts.

These crenellated sections are advantageously distributed in complementary manner over the two jaws 1e, 1f to keep a symmetrical profile, so that the jaws are identical and require only one manufacturing mold.

Still according to this example and with the same aim of increasing the distance of immunity against gliding arcs, the lateral flanks of the ridge comprise ribs 7 that increase the running distance between tubes between said cut-outs.

The height of the ribs and the length of the wings 31, 32 can be adjusted to increase the distance to the surface of the jaws if necessary.

FIG. 9 shows the jaws 1e, 1f nested and the additional sections that make the crenellated nesting.

The clamping ring thus makes an electrical cut-out separator designed to insulate perfectly the tubes between themselves and to insulate the tubes from their environment, i.e. screws etc.; its design allows an air gap sufficient to avoid any arc between the metal parts to be obtained.

According to the example in FIG. 7, the jaws are made of a material that is highly resistive, to prevent the passage of strong currents, but sufficiently conductive to evacuate the electrostatic charges created by the passage of fluids in the tubes.

In this case, the metal tubes or conductors are stripped and any covering removed where they pass through ring 1 to realize a resistive electrical conductivity between the tube and the aircraft structure through the ring; the structure is here represented by a metal mounting cradle 20.

The mounting of the ring 1 on the cradle 20 is realized with screws 21 that pass through the rings at the holes 13 and that screw into the tapped holes in the cradle 20, which tightens the jaws on the tubes. The transversal cut-outs 2 are sized to retain the tubes while allowing a translation of the piping to facilitate its installation.

Other solutions for fastening the rings on their cradles are, of course, possible.

Thermoplastic materials on their own are to be avoided to realize the rings, because they are insulators that may charge with static electricity, with a concomitant risk of electrical arcing at the ring.

Carbon-filled glass fiber or carbon-filled PEEK that stop high intensity currents and drain electrostatic currents will be the preferred materials.

The rings according to the invention are used to mount and adjust rigid metal piping in composite material tanks subjected to high voltage currents.

They can be adapted to any type of environment and to any system, in particular hydraulic, installed in a tank or not.

More generally, the principles that guide the realization of the device according to the invention, either as alternatives or in combination are that since the ridge 4 comprises several cut-outs 2a, 2b to receive tubes, the distance between cut-outs is chosen depending on a given breakdown voltage.

The baseplate comprises a base that is wider than the ridge and makes a section that increases the running distance between a base 20 and the tube or tubes 10a, 10b;

The heights of the baseplate and of the ridge are designed to maintain the tube or tubes at a given distance from the structure.

The ridge is configured to maintain a tube at a predefined distance from the structure or another tube.

It is also possible to reduce the footprint of the clamping ring by including separating sections, as seen above with reference to FIGS. 8 and 9, which allow the area required to avoid the generation of gliding arcs all around the metal piping to be achieved.

The invention is not limited to the examples shown and, in particular, the clamping ring can receive three or more tubes.

The invention claimed is:

1. A clamping ring for fastening piping in an aircraft, comprising:
   two jaws shaped and assembled to each other to prevent gliding arcs, the two jaws each including a baseplate with a ridge extending from the baseplate, and the two jaws each including at least one transverse support cut-out for receiving at least one tube,
   wherein the baseplate is wider than the ridge along a same plane,
   wherein the at least one transverse support cut-out is disposed on an upper surface of the ridge opposite of the baseplate,
   wherein the ridge includes a column that extends from the ridge on a first longitudinal side of the ridge relative to the at least one transverse support cut-out,
   wherein lateral flanks of the ridge include ribs that project from the lateral flanks in an axial direction of the at least one transverse support cut-out, and wherein the baseplate includes a first mounting hole penetrating through the baseplate, the ridge, and the column on the first longitudinal side.

2. The clamping ring for fastening piping according to claim 1, wherein the ridge is offset on the first longitudinal side of the baseplate, leaving an opposite longitudinal side of the baseplate with a free portion.

3. The clamping ring for fastening piping according to claim 1,
wherein an upper surface of the baseplate, an upper surface of the ridge, and an upper surface of the column form a stair-shaped section.

4. The clamping ring for fastening piping according to claim 2,
wherein an upper surface of the baseplate, an upper surface of the ridge, and an upper surface of the column form a stair-shaped section, and
wherein the two jaws are nesting symmetrical parts, the column of a first jaw of the two jaws completes the ridge of a second jaw of the two jaws at the free portion of the baseplate of the second jaw.

5. The clamping rim according to claim 1, wherein the ridge comprises a plurality of transverse support cut-outs to receive a plurality of tubes, the plurality of transverse support cut-outs being spaced a distance to avoid electrical breakdown.

6. The clamping ring according to claim 5, wherein the upper surface of the ridge includes at least one crenellated structure, and the at least one crenellated structure is located between the plurality of transverse support cut-outs to increase a running distance between the plurality of tubes and between the plurality of transverse support cut-outs.

7. The clamping ring according to claim 1, wherein the ridge includes a plurality of transverse support cut-outs to receive a plurality of tubes, and
wherein the lateral flanks of the ridge include the ribs to increase a running distance between the plurality of tubes and between the plurality of transverse support cut-outs.

8. The clamping ring according to claim 1, wherein the baseplate includes a base that is wider than the ridge and increases a running distance between a bracket and the at least one tube.

9. The clamping ring according to claim 1, wherein a height of the baseplate and a height of the ridge are sized to maintain the at least one tube a given distance away from a structure of the aircraft receiving the clamping ring.

10. The clamping ring according to claim 1, wherein the ridge maintains the at least one tube at a predefined distance from a structure of the aircraft receiving the clamping ring or another tube.

11. The clamping ring according to claim 2, wherein the baseplate includes a second mounting hole penetrating the baseplate at the free portion on the opposite longitudinal side of the baseplate.

12. The clamping ring according to claim 3, wherein the baseplate includes a second mounting hole penetrating the baseplate on an opposite longitudinal side of the baseplate.

13. The clamping ring according to claim 4, wherein the column of the second jaw completes the ridge of the first jaw at the free portion of the baseplate of the first jaw.

14. The clamping ring according to claim 13, wherein when the two jaws are nested, the stair-shaped section of the first jaw and the second jaw forms an air gap to prevent gliding arcs, the air gap being located between the stair-shaped section of the first jaw and the second jaw when the two jaws are nested.

15. The clamping ring according to claim 14, wherein the air gap is at least 10 mm in a direction of a minimum distance between the stair-shaped section of the first jaw and the second jaw when the two jaws are nested.

16. The clamping ring according to claim 14, wherein the air gap is at least 25 mm in length along a path that follows a section of one of the two jaws between an outside of said one of the two jaws and the at least one transverse support cut-out of said one of the two jaws.

17. The clamping ring according to claim 5, wherein the distance is greater than or equal to 25 mm in a direction perpendicular to the axial direction and along a plane of the upper surface of the ridge.

18. The clamping ring according to claim 1, wherein the clamping ring is made of carbon-filled glass fiber or carbon-filled PEEK.

19. The clamping ring according to claim 1, wherein the baseplate is wider than the ridge along a same plane in the axial direction of the at least one transverse support cut-out.

20. The clamping ring according to claim 1, wherein the mounting hole includes a closed-loop peripheral surface that is at least partially formed in the baseplate.

21. An assembly comprising:
at least one of the clamping ring according to claim 1; and
the at least one tube that is an aircraft fuel pipe.

* * * * *